(12) United States Patent
Plassmann et al.

(10) Patent No.: US 6,549,952 B1
(45) Date of Patent: Apr. 15, 2003

(54) PASSING ENVIRONMENT VARIABLES FROM AN HYPERTEXT PROTOCOL SERVER APPLICATION PROGRAMMING INTERFACE

(75) Inventors: Ernst Robert Plassmann, Pflugerville, TX (US); Michael Bradford Ault, Austin, TX (US); Mickella Ann Rosiles, Austin, TX (US); Shaw-Ben Shi, Austin, TX (US); Theodore Jack London Shrader, Cedar Park, TX (US); Bruce Arland Rich, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/790,040

(22) Filed: Jan. 28, 1997

(51) Int. Cl.[7] .................................................. G06F 9/00
(52) U.S. Cl. ...................................... 709/311; 709/328
(58) Field of Search ............................ 395/682, 200.75, 395/200.33, 684, 200.57; 709/328, 330, 311, 219, 228, 203, 246

(56) References Cited

U.S. PATENT DOCUMENTS

| | | | |
|---|---|---|---|
| 5,404,523 A | * 4/1995 | DellaFera et al. | ........... 395/650 |
| 5,530,852 A | 6/1996 | Meske, Jr. et al. | |
| 5,550,984 A | 8/1996 | Gelb | |
| 5,761,673 A | * 6/1998 | Bookman et al. | ............ 707/104 |
| 5,768,510 A | * 6/1998 | Gish | ...................... 395/200.33 |
| 5,793,966 A | * 8/1998 | Amstein et al. | ......... 395/200.33 |
| 5,802,518 A | * 9/1998 | Karaev et al. | ................... 707/9 |
| 5,826,029 A | * 10/1998 | Gore, Jr. et al. | .......... 395/200.57 |
| 5,870,546 A | * 2/1999 | Kirsch | .................... 395/200.33 |
| 5,991,802 A | * 11/1999 | Allard et al. | ................ 709/219 |

OTHER PUBLICATIONS

Y. Liu, et al, "A Distributed Connection Manager Interface for Web Services on IBM SP Systems", IEEE, pp. 2–9, Jun. 1996.*
E. Evans, et al, "Using Java Applets and CORBA for Mutli–user Distributed Applications", IEEE on Internet Computing, pp. 43–55, May 1997.*
S. Lines, How to Program CGI with Perl 5.0, Ziff–Davis Press, Chapter 1, pp. 1–11, Sep. 1996.*
J. Trevor, et al, "Exercising daemons: a modular and light-weight approach to deploying applicaitons on the Web", Compter Networks and ISDN Systems, vol. 28, pp. 1053–1062, May 1996.*

* cited by examiner

Primary Examiner—Sue Lao
(74) Attorney, Agent, or Firm—Jeffrey S. LaBaw; Joseph R. Burwell; David H. Judson

(57) ABSTRACT

A method of enabling an HTTP server plug-in to pass an unmangled environment variable into a CGI process begins by configuring the HTTP server to initially override a CGI service method. When the server processes an HTTP request, the server plug-in, which is called prior to the CGI service method and is running in a process of the HTTP server, inserts a "name value" pair prepended with a marker in a request header parameter block of the HTTP server. Then, the CGI service override method executes the server's original (i.e. native) CGI service method, causing it to run an encapsulation program in the CGI process. This program scans the environment of the CGI process for any string prepended with a given HTTP code (e.g., the string "HTTP__") and the marker. If it finds any such string, the program strips the given HTTP code and the marker from a remainder of the string and resets the environment variable into the CGI process in an "unmangled" form. The target CGI program is then executed in the CGI process.

20 Claims, 3 Drawing Sheets

PASSING ENVIRONMENT VARIABLES FROM AN HYPERTEXT PROTOCOL SERVER APPLICATION PROGRAMMING INTERFACE

TECHNICAL FIELD

The present invention relates generally to passing information between client and server programs in a Web transaction environment.

BACKGROUND OF THE INVENTION

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

HTTP servers available from Netscape Communications Corporation (Mountain View, Calif.) are in common use. Netscape HTTP servers provide a plug-in application programming interface (API) which allow non-Netscape programs to override or enhance the functionality of the HTTP server. In a typical Web transaction, an HTTP server follows a defined sequence of steps, called server methods, when responding to a request from an HTTP-compliant browser. These steps include authenticating user id's and passwords, mapping URL's to local filesystem path names, checking user access to translated paths, identifying additional object types on requests, performing service requests (e.g., return objects or execute CGI programs), and log server events. The plug-ins can be called to execute within a Netscape server process to override or complement these server methods.

Serving Common Gateway Interface (CGI) programs are an important part of the HTTP server function. CGI programs are typically used to return dynamic information and to respond to HTTP browser input in HTML forms. They normally run as child processes created under HTTP server processes. There has now been recognized a need to insert environment variables into CGI program processes. There are several reasons for this. Thus, for example, a plug-in might need to set authentication information in the child process so that a CGI program can access protected resources on the browser user's behalf. Or, it may be desirable to set up application preferences specified by the user, or to set path information based on the location of a desired application.

Presently, Netscape HTTP servers do not provide a mechanism for setting dynamic, non-Netscape defined (sometimes referred to herein as "non-conforming") environment variables in CGI processes. Non-conforming environment variables can be set in the initial configuration (using the init-cgi directive), but these variables are not dynamic in that they cannot be set or modified by plug-ins. Plug-ins can partially define environment variables by inserting a variable name into a Netscape parameter block (pb) called request->headers. However, when the Netscape send-cgi service method executes the CGI's process, it "mangles" the resulting environment variable by prepending "HTTP_" in front of the initial variable name. This is useful if the plug-in developer has control over the CGI programs being executed, but plug-ins may need to provide a service that is transparent to existing CGI programs.

It would therefore be desirable to provide a mechanism to pass non-conforming environment variables from plug-ins to CGI processes and preferably without fully overriding the server send-cgi service method.

BRIEF SUMMARY OF THE INVENTION

It is thus a primary object of the invention to enhance the functionality of an HTTP server application programming interface to enable passing of non-conforming environment variables from hypertext transfer protocol (HTTP) server plug-ins to Common Gateway Interface (CGI) programs.

It is a more particular object to provide a mechanism to pass non-conforming environment variables from plug-ins to CGI processes without completely overriding a send-cgi service method of the HTTP server.

It is a more general object of the invention to enhance the functionality of an HTTP server application programming interface without modifying the server method used to handle CGI service requests.

These and other objects of the invention are achieved in a method of enabling a generic plug-in of an HTTP server to pass an unmangled environment variable into a CGI process. In accordance with a preferred embodiment, the method begins by configuring the HTTP server to initially override a CGI service method. When the server processes an HTTP request, the generic plug-in, which is called prior to the CGI service method and is running in a process of the HTTP server, inserts a "name value" pair prepended with a marker in a request header parameter block of the HTTP server. Then, a CGI service override method of the invention executes the server's original (i.e. native) CGI service method, causing it to run an encapsulation program in the CGI process. This program scans the environment of the CGI process for any string prepended with a given HTTP code (e.g., the string "HTTP_") and the marker. If it finds any such string, the program strips the given HTTP code and the marker from a remainder of the string and resets the environment variable into the CGI process in an "unmangled" form. The target CGI program is then executed in the CGI process.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
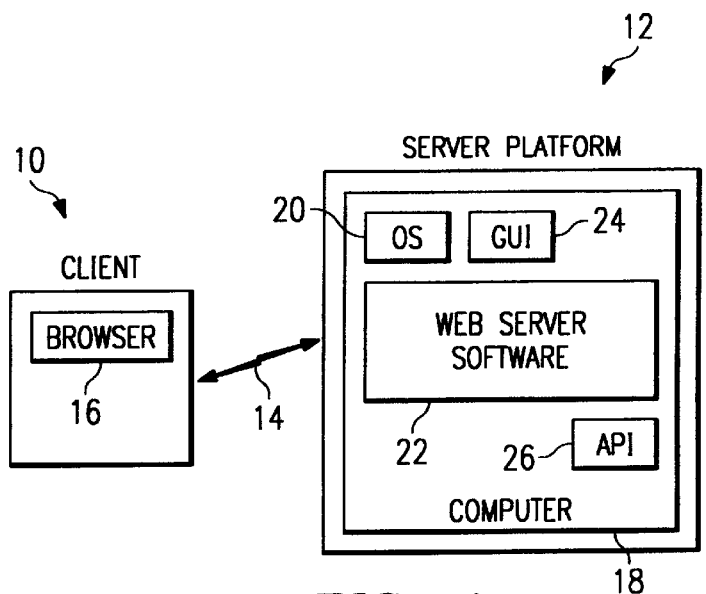
FIG. 1 illustrates the known Internet client-server paradigm.

A representative system in which the present invention is implemented is illustrated in FIG. 1. A client machine 10 is connected to a Web server platform 12 via a communication channel 14. For illustrative purposes, channel 14 is the Internet, an Intranet or other known connection. In the case of the Internet, Web server platform 12 is one of a plurality of servers which are accessible by clients, one of which is illustrated by machine 10. A client machine includes a browser 16, which is a known software tool used to access the servers of the network. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/web server combinations may be used.

Figure 2:
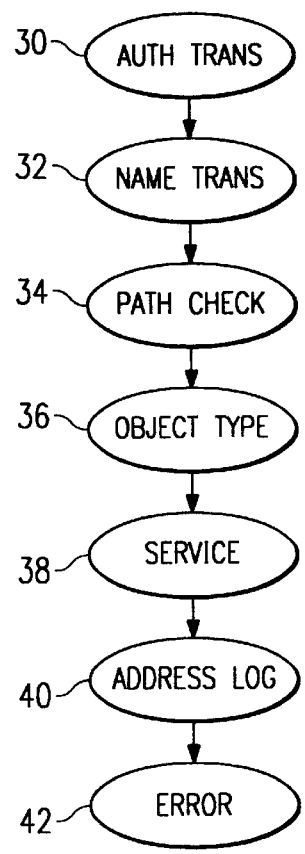
FIG. 2 is a flowchart of the methods that are carried out by a Web server in response to receipt of a request from a client machine.

The Web Server accepts a client request and returns a response. The operation of the server 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. The present invention primarily concerns the situation where the server function runs a CGI program resident on the Web server. At step 40, called Add Log (AddLog), information about the transaction is recorded. At step 42, called Error, the server responds to the client when it encounters an error. Further details of these operations may be found in the Netscape *Web Server Programmer's Guide*, Chapter 5, which is incorporated herein by reference.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins."

By way of additional background, the server stores variables in name/value pairs. The parameter block, or pblock, is a hash table keyed on the name string. The pblock maps these name strings onto their value character strings. A plug-in function uses parameter blocks to get, change, add and remove name/value pairs of data. A set of known parameter manipulating functions may be used to add, remove, edit and create name/value pairs, as more particularly described, for example, in the Netscape *Programmer's Guide*, discussed above. The pb_param structure is used to manage the name/value pairs for each client request, and the pb_entry structure creates linked lists of pb_param structures.

In the Netscape server, the Request->vars parameter block contains the server's working variables. The set of active variables changes as the different server methods are processed. The Request->headers parameter block contains the client's HTTP headers in the form {Name:value}. The Request->srvhdrs parameter block is the set of HTTP headers for the server to send back to the client. A request_header functions finds the parameter block that contains the client's HTTP headers. If the client sends to the server any HTTP headers along with its request, then these headers are placed into the environment, with the names of the environment variables being the names of the HTTP headers, prefixed with HTTP_. All letters in the name are changed to upper case and all hyphens are changed to underscore characters. As will be seen, the present invention extends the use of the request headers (normally headers sent by the browser) to act as a medium for transferring environment variables of any format (i.e. without the HTTP_prepended) to CGI programs.

Serving Common Gateway Interface (CGI) programs are an important part of the HTTP server function. CGI is a World Wide Web standard for extending the functionality of HTML. CGI involves the combination of a live Web server and external programming scripts. CGI programs are typically used to return dynamic information and to respond to HTTP browser input in HTML forms. The Netscape server passes only certain environment variables to the CGI program in order to save storage space and improve security. Thus, for example, the environment variable may contain the name and version of the software that the server is running under, the domain name or IP address of the server machine, the URL that individuals should use to access the server, and the like.

CGI programs usually run as child processes created under HTTP server processes. This known process is now described in conjunction with the process flow diagram shown in FIG. 3.

As illustrated there, the CGI process 50 will be run as a "child" to the HTTP server process 52. In particular, during the Web transaction, the server process 52 executes the AuthTrans, NameTrans, PathCheck and ObjType methods 54a–54d described above with respect to steps 30, 32, 34 and 36 in FIG. 2. At this point in the transaction, the CGI process has not actually been created, although it is shown in the illustration. After executing steps 30, 32, 34 and 36, the service request is handled (which is step 38 in FIG. 2) using the Service method 54e. It is now assumed that the Web transaction involves a CGI script or program. In such case, the HTTP server Process 52 performs a func_exec( ) call to a CGI service method 56, called send-cgi. The send-cgi service method does a fork/exec, which is a Unix method for creating a new process. The fork creates a mirror process, which is the CGI process 50, and the exec is used to start this process with some other code, namely the Target CGI program 58. As a result of the fork/exec, the Target CGI program 58 is executed, and the results returned to the send-cgi service method 56. Thereafter, the HTTP server process returns control to the Addlog service method 54f. The Error service method 54g is then run to complete the server portion of the transaction.

According to the invention, the conventional send-cgi service method 56 is "encapsulated" between code that has been added in the HTTP server process 52 and code that has been added in the CGI child process 50. As used herein, the code added to the HTTP server process is a plug-in referred to herein as "env-send-cgi" and the CGI encapsulation code is a program referred to "setenv.cgi". These programs provide a mechanism for setting dynamic, non-Netscape defined environment variables in the CGI process 50 without overriding or modifying the send-cgi server method.

Figure 3:
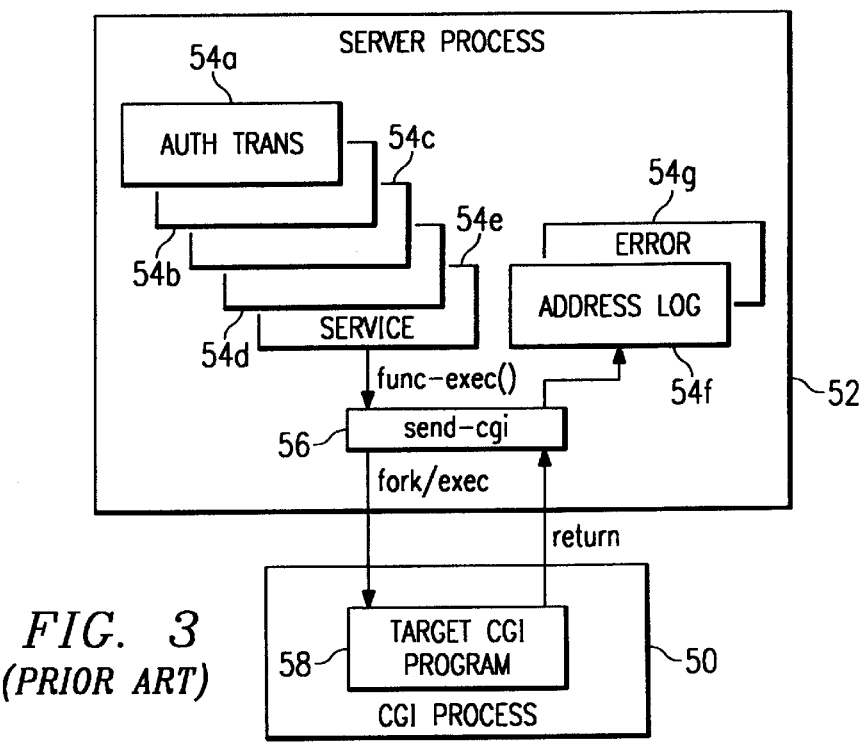
FIG. 3 is a process flow diagram showing how a server process launches a CGI child process according to a known technique.
Figure 4:
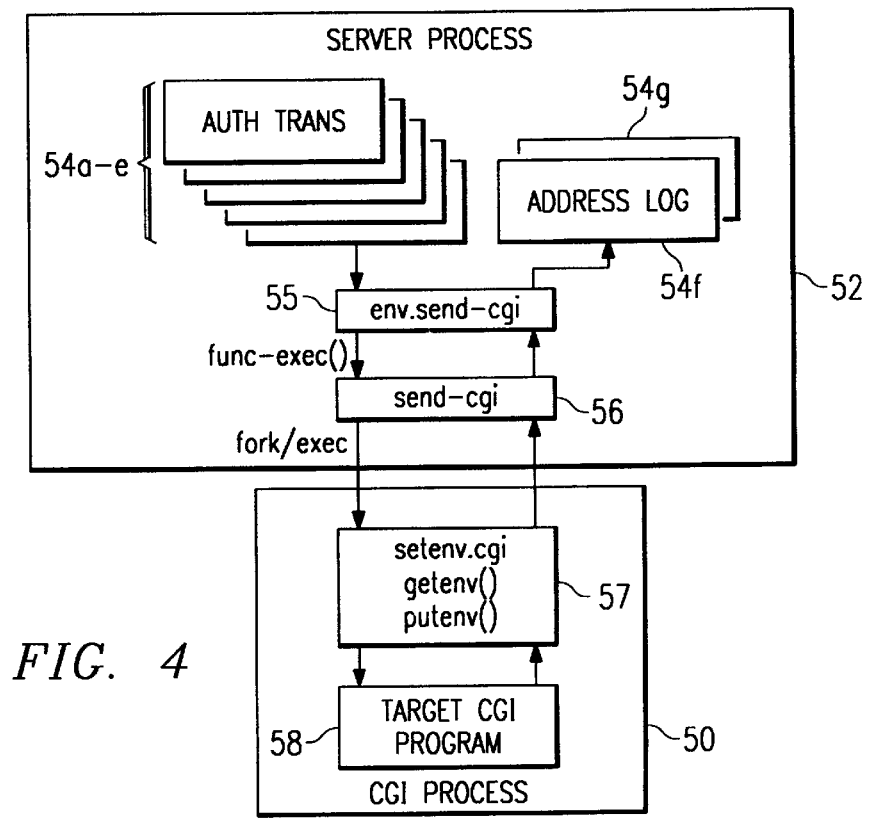
FIG. 4 is a modification of FIG. 3 illustrating the present invention.

The present invention is illustrated in a process flow diagram of FIG. 4. A comparison of the process flow diagrams in FIG. 3 (without the inventive technique) and FIG. 4 (with the technique included) illustrates the novel way in which the Netscape CGI service method (send-cgi) is encapsulated to provide a mechanism for setting dynamic, non-Netscape defined environment variables in CGI processes according to the invention. At the outset, the HTTP server process configuration file (obj.conf) must be modified, in effect, to override (but not replace) the send-cgi service method, which would normally be executed to carry out the CGI service request. Thus, according to the preferred embodiment of the invention, the HTTP server process is configured to override the send-cgi service method by adding into the HTTP server configuration file a load directive for the encapsulation plug-in env-send-cgi.

Now, as seen in FIG. 4, after the HTTP server process 52 has completed the execution of the AuthTran, NameTrans, ObjType and PathCheck methods 54a–54d, it runs the encapsulation plug-in "env-send-cgi" 55 instead of the normal send-cgi service method 56 (as in FIG. 3). After some initial processing (to override the CGI path name with the path name of the CGI process encapsulation program), the encapsulation plug-in env-send-cgi then performs a func_exec( ) call to run the HTTP server's original send-cgi method. The send-cgi service method initiates a fork/exec to create the CGI process 50, which has been modified according to the invention to include the CGI process encapsulation program setenv.cgi. Thus, instead of creating the CGI process and then running the Target CGI program directly, the send-cgi service routine calls the CGI process encapsulation program setenv.cgi provided 57 by the present invention. The encapsulation CGI code sets environment variables and executes the target CGI program 58. After the CGI processing is complete, as will be described, control is returned back to the send-cgi method 56 of the HTTP server process. Send-cgi 56 returns control back to the env-send-cgi plug-in 55, which restores parameter blocks and returns control back to the HTTP server (to complete the AddLog and Error methods 54f–54g).

Figure 5:
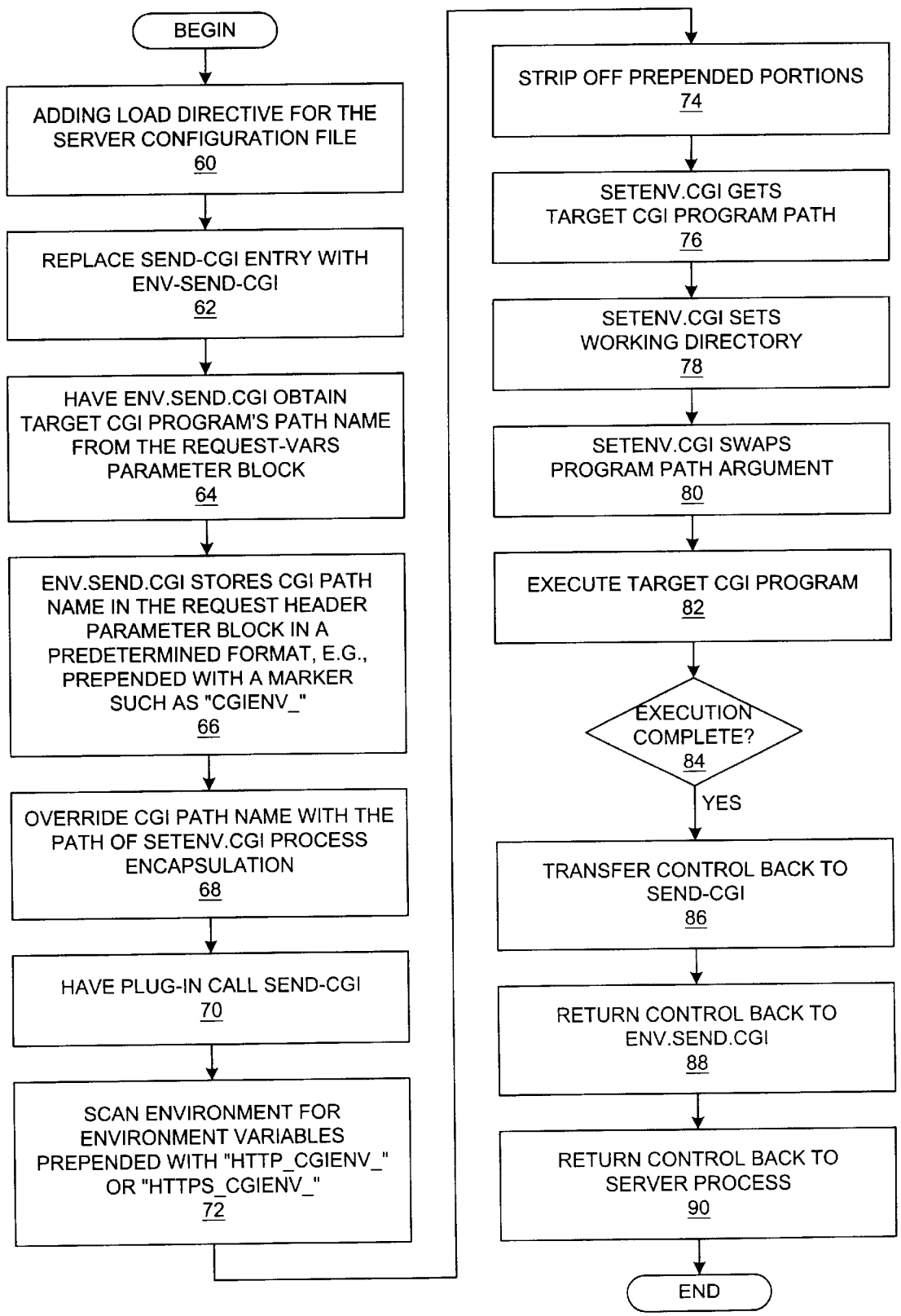
FIG. 5 is a detailed flowchart describing the process flow of the invention.

A more detailed description of the operations provided by the encapsulation routines is now provided and illustrated in the flowchart of FIG. 5. The inventive process begins at step 60 by adding a load directive for the server configuration file (obj.conf) for the plug-in env-send-cgi. In step 62, the entry for send-cgi in the configuration file is replaced with env-send-cgi. Steps 60 and 62 represent a configuration operation in which the server is configured to override the send-cgi service method. These steps will be effected "off-line" (i.e. outside of the context of a given Web transaction). Now, assuming that a Web transaction is in process and the first four steps of the server operation have occurred, the method continues at step 64 by having env-send-cgi get the target CGI program's fully-qualified path name from the request->vars parameter block. At step 66, env-send-cgi stores the CGI path in a predetermined manner so that it will later be visible in the child CGI process as a "mangled" environment variable. This is accomplished, for example, by having env-send-cgi insert a name/value pair (e.g., name=CGIENVPATH and value=the target CGI program's path name) into the request header parameter block of the server. At step 68, the plug-in overrides the CGI path name with the path of the CGI process encapsulation program (setenv.cgi). Thereafter, at step 70, the plug-in calls the server's real send-cgi method. This operation calls the "/usr/bin/setenv.cgi" program currently in the "path" variable, and this is represented at step 71 in the flowchart. Thus, steps 64, 66, 68 and 70 executes env-send-cgi to cause send-cgi to execute the encapsulation CGI setenv.cgi.

As noted above, the encapsulation CGI setenv.cgi sets environment variables and executes the target CGI program in its place. This operation begins at step 72 by having setenv.cgi scan the environment for variables prepended with either string "HTTP_CGIENV_" or "HTTPS_CGIENV_". For each variable that meets this criteria (i.e. being prepended by either string), setenv.cgi continues at step 74 by stripping off the prepended portions of the string (namely, "HTTP_CGIENV_" or "HTTPS_CGIENV_" as the case may be) and storing the remainder of the string back into the environment. Thus, what remains after step 74 is the original "value" of the name/value pair in unmangled form. This value is the environment variable. At step 76, setenv.cgi gets the target CGI program path from the environment. At step 78, setenv.cgi sets the working directory according to the CGI program path. At step 80, setenv.cgi swaps the program path argument (arg 0) according to the CGI program path. The setenv.cgi code then executes the real target CGI program on top of the current process at step 82.

After the CGI program exits and the forked CGI process is terminated, send-cgi continues. This is step 84 in the flowchart. When send-cgi returns at step 86, control passes back to env-send-cgi. At step 88, env-send-cgi restores parameter blocks and returns control back to the server. This completes the processing.

Thus, according to the present invention, with the plug-in (env-send-cgi) and the CGI process encapsulation code (setenv.cgi) installed and configured, any server plug-in called during the AuthTrans, NameTrans, PathCheck or ObjectType steps can set environment variables in CGI processes. This is done simply by inserting "name value" pairs into the request->headers parameter block with the environment variable prepended by the marker, e.g., the string "CGIENV_". This process works because when Netscape send-cgi executes the CGI's process, it normally "mangles" the resulting environment variable by prepending "HTTP_" in front of the initial variable name. The present invention, in effect, inserts another name into the request header block to "mark" or tag the environment variable so that it can be "demangled" (by removing the marker inserted by the present invention as well as the "HTTP_" portion inserted by send-cgi).

The following are representative process and code snippets used to implement the flowchart discussed above in FIG. 5:

Step 60 adds a load directive for the plug-in:

Example

"Init fn=load-modules shlib=/usr/lib/libcgienv.a funcs=env-send-cgi"

Step 62 replaces "send-cgi" with "env-send-cgi":

Example

<Object name="cgi">
ObjectType fn="force-type" type="magnus-internal/cgi"
Service fn="env-send-cgi"
</Object>

Step 64 causes the plug-in (env-send-cgi) to get the target CGI program's fully qualified path name from the request →vars parameter block Example pszTargetCGI=pblock_findval("path", request→vars);

At step 66, the plug-in stores the CGI path so that it will be visible in the child CGI process as a mangled environment variable:

Example pblock_nvinsert("CGIENVPATH",pszTargetCGl, request→headers);

At step 68, the plug-in overrides the CGI path name with the CGI process encapsulation program (setenv.cgi) path:

Example param_free(pblock)remove("path",request→vars));
pblock_nvinsert("path","/usr/bin/setenv.cgi", request→vars)

At step 70, the plug-in calls the Netscape "send-cgi" method, which (at step 71) will call the "/usr/bin/setenv.cgi" program currently in the "path" variable:

Example pblock_copy(param,pb_send_cgi);
param_free(pblock)_remove("fn",pb_send_cgi));
pblock_nvinsert("fn","send-cgi",pb_send_cgi);
retcode=func_exec(pb_send_cgi,sn,rq);

At this point, setenv.cgi processing occurs.

After the CGI processing is complete and "send-cgi" returns, control is passed back to the "env-send-cgi" plug in at step 86.

The plug-in restores the parameter blocks and returns control back to the Netscape server at step 88.

Example pblock_free(pb_send_cgi);
/* Now restore the request→vars "path" for logging purposes */
param_free(pblock_remove("path",request→vars));
pblock_nvinsert("path",targetCGl,request→vars);
return(retcode);

This completes the main processing loop. The following describes the encapsulation CGI "setenv.cgi" operation, which sets environment variables and executes the target CGI program in its place (current process).

At step 72, the code setenv.cgi scans the environment for variables prepended with either strong "HTTP_CGIENV_" or "HTTPS_CGIENV_". For each variable that meets this criteria, at step 74, the original string is stored back into the environment in unmangled form.

Example

UnMangledVariable=MangledVariable+strlen("HTTP_CGIENV_");

or

UnMangledVariable=MangledVariable+strlen("HTTPS_CGIENV_");

putenv(UnMangledVariable);

At step 76, setenv.cgi gets the target CGI program path from the environment:

Example

CGlpath=getenv("HTTP_CGIENVPATH")

At step 78, setenv.cgi sets the working directory according to the CGI program path:

Example strcpy(CGldir,CGlpath);
*(strrchr(CGldir,'/'))='/0';
chdir(CGldir);

At step 80, setenv.cgi swaps the program path argument (argv.0") according to the CGI program path:

Example argv[0]=CGlpath;

At step 82, setenv.cgi executes the real target CGI program on top of the current process:

Example execv(CGlpath,argv);

At step 86, when the target CGI program completes the execution, the CGI process will end, and the Netscape server process will continue ("send-cgi" will gain control, then return back to "env-send-cgi").

When libcgienv.a and setenv.cgi installed and configured, any Netscape server plug-in can set environment variables in CGI processes. This can be done simply by inserting name value pairs into the request→headers parameter block with the environment variable prepended by the string "CGIENV_".

Example util_springf(cgiEnvName,"%s%s","CGIENV_", envVarName):

param_free(pblock_remove(cgiEnvName, request→srvhdrs));

pblock_nvinsert(cgiEnvName,envVarValue, request→srvhdrs);

One of the preferred implementations of the env-send-cgi plug-in and the CGI process encapsulation (setenv.cgi) is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific HTTP Web server, those skilled in the art will recognize that the invention can be practiced, with modification, in other and different HTTP servers that provide a plug-in application programming interface (API). Moreover, while the invention has been specifically described in the context of passing environment variables into CGI programs, this is not a limitation of the invention either. The inventive technique, namely configuring the HTTP server to override a service method and then encapsulating the service method between a first program, executable in the child process, and a second program, executable in the server process that launches the child process, may apply to other service methods besides CGI programs.

Having thus described our invention, what we claim as new and desire to secure by letters patent is set forth in the following claims:

What is claimed is:

1. In a computer network in which a client browser is connectable to a HTTP server, the HTTP server having a plug-in application programming interface (API) and supporting a target CGI program accessible by having a service method of the HTTP server launch a CGI process, a method of enabling a generic server plug-in to pass an environment variable into the CGI process, comprising the steps of:
   (a) configuring the HTTP server to initially override the service method;
   (b) responsive to an HTTP request, having the generic server plug-in insert a name value pair prepended with a marker in a request header parameter block of the HTTP server;
   (c) using the service method, transferring to the CGI process the request header parameter block;
   (d) extracting the name value pair from the request header parameter block; and
   (e) in response to the name value pair extracted from the request header parameter block, resetting the environment variable and providing the request header parameter block to the CGI process for execution.

2. The method as described in claim 1 wherein the step of extracting the name value pair comprises the steps of:
   scanning the request header parameter block for any string prepended with "HTTP_" and the marker; and
   stripping "HTTP_" and the marker from a remainder of the string.

3. The method as described in claim 1 wherein the step of extracting the name value pair comprises the steps of:
   scanning the request header parameter block for any string prepended with "HTTPS_" and the marker; and
   stripping "HTTPS_" and the marker from a remainder of the string.

4. The method as described in claim 1 wherein the HTTP server is Netscape-compatible and the service method is send-cgi.

5. In a computer network in which a client browser is connectable to a Netscape-compatible HTTP server, the HTTP server having a plug-in application programming interface (API) and supporting a target CGI program accessible by having a service method of the HTTP server launch a CGI process, a method of enabling a generic plug-in to pass an unmangled environment variable into the CGI process, comprising the steps of:
   (a) configuring the HTTP server to initially override the service method;
   (b) having the generic plug-in insert a name value pair prepended with a marker in a request header parameter block of the HTTP server;
   (c) using the service method to transfer the request header parameter block to the CGI process;
   (d) extracting the name value pair and the marker from the request header parameter block using a given HTTP code and the marker to locate the name value pair; and
   (e) stripping the given HTTP code and the marker from a remainder of the string; and
   (f) resetting the environment variable in response to the name value pair extracted from the request header parameter block and providing the request header parameter block to to the CGI process.

6. The method as described in claim 5 wherein the given HTTP code is "HTTP_".

7. The method as described in claim 5 wherein the given HTTP code is "HTTPS_".

8. A mechanism for enabling a generic plug-in to pass an environment variable into a CGI process, the generic plug-in executable within an HTTP server process, the mechanism comprising:
   a service encapsulation program executable in a server process and responsive to an HTTP request for calling a native CGI service method, wherein the service encapsulation program inserts the environment variable along with a marker into a message; and
   a CGI encapsulation program executable in a CGI process and responsive to execution of the native CGI service method for scanning an environment of the CGI process, the CGI encapsulation program using the marker to extract the environment variable from the message and resetting the environment variable into the CGI process in an unmangled form.

9. The mechanism as described in claim 8 wherein the service encapsulation program includes:

means for inserting a name value pair prepended with a marker in a request header parameter block of the HTTP server; and means for executing a CGI service override method to call the native CGI service method.

10. The mechanism as described in claim 9 wherein the CGI encapsulation program includes:

means for scanning an environment of the CGI process for any string prepended with a given HTTP code and the marker; and means responsive to the scanning means for stripping the given HTTP code and the marker from a remainder of the string.

11. The mechanism as described in claim 8 further including means for modifying a configuration of the HTTP server process to override the native CGI service method with the service encapsulation program.

12. A computer program product executable in a computer for enabling a generic server plug-in to pass an environment variable into a CGI process, the generic plug-in executable within an HTTP server process, the computer program product comprising:

a computer-readable substrate; and program code encoded in the computer-readable substrate and including:

a service encapsulation program executable in a server process and responsive to an HTTP request for calling a native CGI service method, wherein the service encapsulation program inserts the environment variable into a transmission to the native CGI service method along with a marker; and a CGI encapsulation program executable in a CGI process and responsive to execution of the native CGI service method for scanning an environment of the CGI process, the CGI encapsulation program extracting the environment variable from the transmission using the marker and resetting an environment variable into the CGI process in an unmangled form.

13. The computer program product as described in claim 12 wherein the service encapsulation program code includes:

means for inserting a name value pair prepended with a marker in a request header parameter block of the HTTP server; and means for executing a CGI service override method to call the native CGI service method.

14. The computer program product as described in claim 13 wherein the CGI encapsulation program code includes:

means for scanning an environment of the CGI process for any string prepended with a given HTTP code and the marker; and means responsive to the scanning means for stripping the given HTTP code and the marker from a remainder of the string.

15. The computer program produce as described in claim 12 wherein the program code further includes means for modifying a configuration of the HTTP server to override the native CGI service method with the service encapsulation program code.

16. A method of enabling a generic server plug-in to pass an unmangled environment variable into a CGI process, the generic server plug-in executable within an HTTP server process, comprising the steps of:

inserting an environment variable and a marker for the environment variable into a message;

transferring the message using the HTTP server process which normally mangles the environment variable; and receiving the message at the CGI service method within a first program executable in a CGI process and a second program executable in a server process, the first program including means for extracting the mangled environment variable.

17. The method as described in claim 16 wherein the second program controls the CGI service method to run the first program.

18. In a computer network in which a client browser is connectable to an HTTP server, the HTTP server having a plug-in application programming interface (API) and including at least one server process that launches a child process, the improvement comprising:

means for inserting an environment variable and a marker for the environment variable into a message;

means for transferring the message using the HTTP server that launches the child process which normally mangles the environment variable; and means for receiving the message at the service method between a first program, executable in the child process, and a second program, executable in the server process, wherein the first program includes means for extracting the mangled environment variable.

19. In the computer network as described in claim 18 wherein the child process is a CGI process.

20. A computer, comprising:

a processor;

an operating system;

a Web server program for processing HTTP client requests; and a mechanism for enabling a generic plug-in to pass an environment variable into a CGI process, comprising:

a service encapsulation program executable in a server process and responsive to an HTTP request for calling a native CGI service method, the service encapsulation program inserting an environment variable into a message, the service encapsulation program normally mangling the environment variable; and a CGI encapsulation program executable in the CGI process and responsive to execution of the native CGI service method for scanning message, extracting the environment variable and resetting an environment variable into the CGI process in an unmangled form.

* * * * *